(12) United States Patent
Tanaka (10) Patent No.: US 9,470,711 B2
(45) Date of Patent: Oct. 18, 2016

(54) PHYSICAL QUANTITY SENSOR AND ELECTRONIC APPARATUS

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 558 days.

(21) Appl. No.: 13/853,437

(22) Filed: Mar. 29, 2013

(65) Prior Publication Data

US 2013/0255382 A1   Oct. 3, 2013

(30) Foreign Application Priority Data

Apr. 2, 2012   (JP) ................. 2012-084156

(51) Int. Cl.
*G01P 15/125*   (2006.01)
*G01P 15/08*   (2006.01)

(52) U.S. Cl.
CPC ......... *G01P 15/125* (2013.01); *G01P 15/0802* (2013.01); *G01P 2015/0814* (2013.01)

(58) Field of Classification Search
CPC .................................................. G01P 15/125
USPC ...................................................... 73/514.32
See application file for complete search history.

(56) References Cited

U.S. PATENT DOCUMENTS

| | | | | |
|---|---|---|---|---|
| 5,983,721 | A * | 11/1999 | Sulzberger | B81B 3/0072 361/280 |
| 7,520,171 | B2 * | 4/2009 | Merassi | G01P 15/125 73/497 |
| 7,631,558 | B2 * | 12/2009 | Diem | G01C 19/5747 73/504.12 |
| 7,637,160 | B2 * | 12/2009 | Koury, Jr. | B81B 3/0094 73/514.32 |
| 8,307,709 | B2 * | 11/2012 | Ullrich | G01P 15/125 73/514.32 |
| 2006/0032310 | A1 | 2/2006 | Merassi et al. | |
| 2007/0238212 | A1 * | 10/2007 | Merassi | G01P 15/125 438/48 |
| 2007/0272015 | A1 * | 11/2007 | Kazama | G01C 19/5712 73/504.08 |

FOREIGN PATENT DOCUMENTS

| | | |
|---|---|---|
| JP | 10111312 A | 4/1998 |
| JP | 2002340926 A | 11/2002 |
| JP | 2007139505 A | 6/2007 |
| JP | 2008089581 A | 4/2008 |
| JP | 2011523905 A | 8/2011 |
| WO | WO-2009145967 A1 | 12/2009 |

* cited by examiner

*Primary Examiner* — Hezron E Williams
*Assistant Examiner* — Mark A Shabman
(74) *Attorney, Agent, or Firm* — Harness, Dickey & Pierce, P.L.C.

(57) ABSTRACT

A physical quantity sensor includes: a fixed portion; a fixed electrode portion; and a movable body that includes a support portion disposed around the fixed portion in plan view, a movable electrode portion supported by the support portion, extending along a first axis, and arranged to face the fixed electrode portion, and a coupling portion coupling the fixed portion with the support portion, and is displaceable along a second axis crossing the first axis.

10 Claims, 8 Drawing Sheets

PHYSICAL QUANTITY SENSOR AND ELECTRONIC APPARATUS

BACKGROUND

1. Technical Field

The present invention relates to a physical quantity sensor and an electronic apparatus.

2. Related Art

In recent years, physical quantity sensors that detect a physical quantity using, for example a silicon MEMS (Micro Electro Mechanical Systems) technique have been developed.

The physical quantity sensor has, for example, a fixed electrode fixed to a substrate and a movable electrode arranged to face the fixed electrode via a space. The physical quantity sensor detects a physical quantity such as acceleration based on an electrostatic capacitance between the fixed electrode and the movable electrode.

For example, JP-A-2007-139505 discloses an acceleration sensor including a movable body that is supported by two anchor portions (fixed portions) and includes a frame member and a movable electrode.

However, in the acceleration sensor disclosed in JP-A-2007-139505, both ends of the movable body are supported by two fixed portions. Therefore, when heat is applied for example, stress due to the fact that the movable body is supported by the two fixed portions sometimes occurs in the movable body. This causes torsion in the movable body for example, sometimes leading to the lowering of sensitivity of the acceleration sensor.

SUMMARY

An advantage of some aspects of the invention is to provide a physical quantity sensor that can suppress the occurrence of stress in a movable body. Another advantage of some aspects of the invention is to provide an electronic apparatus having the physical quantity sensor.

The invention can be implemented as the following modes or application examples.

APPLICATION EXAMPLE 1

This application example is directed to a physical quantity sensor including: a fixed portion; a fixed electrode portion; and a movable body that includes a support portion disposed around the fixed portion in plan view, a movable electrode portion supported by the support portion, extending along a first axis, and arranged to face the fixed electrode portion, and a coupling portion coupling the fixed portion with the support portion, and is displaceable along a second axis crossing the first axis.

According to the physical quantity sensor, compared to a form in which both ends of the movable body are supported by two fixed portions, the occurrence of stress in the movable body due to the fact that the movable body is supported by the fixed portion can be suppressed when, for example, heat is applied or the physical quantity sensor is mounted using a molding resin. As a result, in the physical quantity sensor, the occurrence of torsion in the movable body, for example, can be suppressed, so that high sensitivity can be provided.

APPLICATION EXAMPLE 2

In the physical quantity sensor according to the application example, the support portion includes a first beam portion that extends along the first axis and a second beam portion that extends along the second axis.

According to this physical quantity sensor, the movable body can be supported more stably.

APPLICATION EXAMPLE 3

In the physical quantity sensor according to the application example, the fixed portion may be disposed to overlap, in plan view, with the center of gravity of a structure that is configured to include the fixed portion and the movable body.

According to this physical quantity sensor, the movable body can be supported more stably.

APPLICATION EXAMPLE 4

In the physical quantity sensor according to the application example, the first beam portion may include a function of the movable electrode portion, and the fixed electrode portion may be disposed to face the first beam portion.

According to this physical quantity sensor, high sensitivity can be provided.

APPLICATION EXAMPLE 5

In the physical quantity sensor according to the application example, the movable electrode portion may be disposed next to the coupling portion.

According to this physical quantity sensor, the exertion of an unnecessary electrostatic force on the coupling portion due to the fixed electrode portion can be suppressed by the movable electrode portion. With this configuration, the movable body can operate stably.

APPLICATION EXAMPLE 6

In the physical quantity sensor according to the application example, a pair of the second beam portions may be disposed along the second axis, and the movable electrode portion may extend from each of the second beam portions along the first axis.

According to this physical quantity sensor, the occurrence of stress in the movable body can be suppressed.

APPLICATION EXAMPLE 7

In the physical quantity sensor according to the application example, a pair of the second beam portions may be disposed along the second axis, and both ends of the movable electrode portion are connected respectively to the second beam portions.

According to this physical quantity sensor, high rigidity can be provided.

APPLICATION EXAMPLE 8

In the physical quantity sensor according to the application example, at least two of the movable electrode portions may face the fixed electrode portion.

According to this physical quantity sensor, a reduction in size can be achieved.

APPLICATION EXAMPLE 9

This application example is directed to an electronic apparatus including the physical quantity sensor according to the application example.

According to this electronic apparatus, the physical quantity sensor that can suppress the occurrence of stress in the movable body can be included.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail using the drawings. The embodiment described below does not unduly limit the contents of the invention set forth in the appended claims. Moreover, not all of configurations described below are indispensable constituent features of the invention.

1. Physical Quantity Sensor

Figure 1:
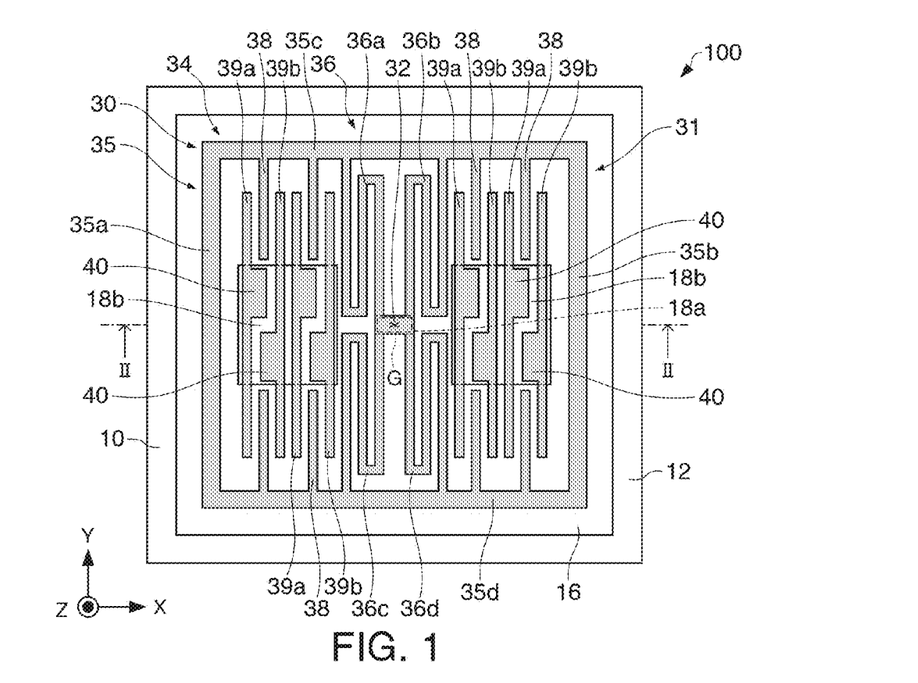
FIG. 1 is a plan view schematically showing a physical quantity sensor according to an embodiment.
Figure 2:
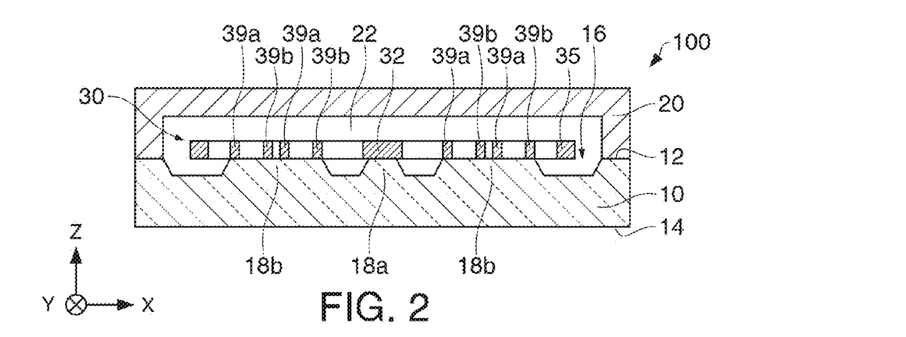
FIG. 2 is a cross-sectional view schematically showing the physical quantity sensor according to the embodiment.

First, a physical quantity sensor according to an embodiment will be described with reference to the drawings. FIG. 1 is a plan view schematically showing the physical quantity sensor 100 according to the embodiment. FIG. 2 is a cross-sectional view schematically showing the physical quantity sensor 100 according to the embodiment, taken along line II-II of FIG. 1. In FIGS. 1 and 2, the X-axis, the Y-axis, and the Z-axis are illustrated as three axes perpendicular to each other.

The physical quantity sensor 100 can be used as, for example, an inertial sensor. Specifically, the physical quantity sensor 100 can be used as, for example, an acceleration sensor (electrostatic capacitive acceleration sensor or electrostatic capacitive MEMS acceleration sensor) for measuring acceleration in the horizontal direction (X-axis direction).

As shown in FIGS. 1 and 2, the physical quantity sensor 100 includes a substrate 10, a fixed portion 32, a movable body 34, and fixed electrode portions 39a and 39b. The fixed portion 32, the movable body 34, and the fixed electrode portions 39a and 39b constitute a functional element 30. The movable body 34 includes a support portion 35, a coupling portion 36, and movable electrode portions 38. Further, the physical quantity sensor 100 can include a lid 20. For convenience sake, the illustration of the lid 20 is omitted in FIG. 1.

The material of the substrate 10 is, for example, glass or silicon. As shown in FIG. 2, the substrate 10 has a first surface 12 and a second surface 14 on the side opposed to the first surface 12. In the first surface 12, a recess 16 is disposed. The movable body 34 is disposed above the recess 16 via a space. The movable body 34 can be displaced along the X-axis due to the recess 16 without being obstructed by the substrate 10. The planar shape (shape as viewed from the Z-axis direction) of the recess 16 is not particularly limited.

The substrate 10 has post portions 18a and 18b surrounded by the recess 16 in plan view (as viewed from the Z-axis direction). The post portion 18a is a portion for supporting the fixed portion 32. The post portions 18b are portions for supporting the fixed electrode portions 39a and 39b. In the illustrated example, one post portion 18a and two post portions 18b are disposed. The post portion 18a is located between, for example, the two post portions 18b. The planar shape of the post portions 18a and 18b is, for example, quadrilateral.

The lid 20 is disposed on the substrate 10 (the first surface 12 of the substrate 10). The substrate 10 and the lid 20 can constitute a package. The substrate 10 and the lid 20 can form a cavity 22. The functional element 30 can be accommodated in the cavity 22. The cavity 22 may be hermetically sealed in, for example, an inert gas (for example, nitrogen gas) atmosphere.

The material of the lid 20 is, for example, silicon or glass. A method for bonding the lid 20 with the substrate 10 is not particularly limited. However, when, for example, the material of the substrate 10 is glass and the material of the lid 20 is silicon, the substrate 10 and the lid 20 can be anodically bonded together.

The functional element 30 is supported on the substrate 10. The functional element 30 is accommodated in the cavity 22 surrounded by the substrate 10 and the lid 20.

The movable body 34 is displaced in the X-axis direction (positive X-axis direction or negative X-axis direction) according to acceleration in the X-axis direction. With such displacement, the sizes of a gap between the movable electrode portion 38 and the fixed electrode portion 39a and a gap between the movable electrode portion 38 and the fixed electrode portion 39b are changed. That is, with displacement of the movable body 34, the magnitudes of an electrostatic capacitance between the movable electrode portion 38 and the fixed electrode portion 39a and an electrostatic capacitance between the movable electrode portion 38 and the fixed electrode portion 39b are changed. Based on changes in these electrostatic capacitances, the physical quantity sensor 100 can detect acceleration in the X-axis direction.

The fixed portion 32 is fixed (bonded) to the post portion 18a of the substrate 10. The number of the fixed portions 32 is one. The fixed portion 32 is disposed to overlap, in plan view as shown in FIG. 1, with a center of gravity G of a structure 31 that is configured to include the fixed portion 32 and the movable body 34. The planar shape of the fixed portion 32 is, for example, quadrilateral. In the example shown in FIG. 1, the post portion 18a is located inside the outer edge of the fixed portion 32. The movable body 34 is supported by the fixed portion 32 above the substrate 10 via a space.

The support portion 35 is disposed above the substrate 10 via a space. The support portion 35 is disposed around the fixed portion 32 in plan view as shown in FIG. 1. In the illustrated example, the support portion 35 is disposed to surround the fixed portion 32. The movable body 34 is supported by the fixed portion 32 located inside the support portion 35. The support portion 35 can support the movable electrode portions 38.

The shape of the support portion 35 is, for example, frame-like. The support portion 35 has, for example, first beam portions 35a and 35b extending along the Y-axis (first axis) and second beam portions 35c and 35d extending along the X-axis (second axis). That is, the pair of first beam portions are disposed along the Y-axis, and the pair of second beam portions are disposed along the X-axis. The first beam portion 35a is located on the negative X-axis side of the fixed portion 32. The first beam portion 35b is located on the positive X-axis side of the fixed portion 32. The second beam portion 35c is located on the positive Y-axis side of the fixed portion 32 and extends from the first beam portion 35a to the first beam portion 35b. The second beam portion 35d is located on the negative Y-axis side of the fixed portion 32 and extends from the first beam portion 35a to the first beam portion 35b.

Although not illustrated, the support portion 35 may not be disposed to surround the fixed portion 32 in plan view. For example, the support portion 35 may not have one of the first beam portions 35a and 35b.

The coupling portion 36 is disposed above the substrate 10 via a space. The coupling portion 36 couples the fixed portion 32 with the support portion 35. The coupling portion 36 is displaceable along the X-axis and configured to be able to displace the support portion 35 in the X-axis direction.

The coupling portion 36 has, for example, a first extending portion 36a, a second extending portion 36b, a third extending portion 36c, and a fourth extending portion 36d. The first extending portion 36a extends from the fixed portion 32 to the second beam portion 35c of the support portion 35 in the negative X-axis direction while reciprocating along the Y-axis. The second extending portion 36b extends from the fixed portion 32 to the second beam portion 35c in the positive X-axis direction while reciprocating along the Y-axis. The third extending portion 36c extends from the fixed portion 32 to the second beam portion 35d of the support portion 35 in the negative X-axis direction while reciprocating along the Y-axis. The fourth extending portion 36d extends from the fixed portion 32 to the second beam portion 35d of the support portion 35 in the positive X-axis direction while reciprocating along the Y-axis.

In the illustrated example, the first extending portion 36a and the third extending portion 36c are symmetrical with respect to a first line (not shown) passing through the center of gravity G and parallel to the X-axis. Similarly, the second extending portion 36b and the fourth extending portion 36d are symmetrical with respect to the first line. Moreover, the first extending portion 36a and the second extending portion 36b are symmetrical with respect to a second line (not shown) passing through the center of gravity G and parallel to the Y-axis. Similarly, the third extending portion 36c and the fourth extending portion 36d are symmetrical with respect to the second line.

In the illustrated example, the coupling portion 36 has four extending portions. However, the number of extending portions is not particularly limited as long as the coupling portion 36 is configured to be able to displace the support portion 35 in the X-axis direction.

The movable electrode portions 38 are supported by the support portion 35. The movable electrode portion 38 is arranged to face the fixed electrode portions 39a and 39b. The movable electrode portions 38 are connected to the support portion 35. More specifically, one end of the movable electrode portion 38 is connected to the support portion 35, while the other end is not connected to the support portion 35. The movable electrode portion 38 extends from the support portion 35 along the Y-axis.

In the illustrated example, the plurality of movable electrode portions 38 are disposed and extend from each of the second beam portions 35c and 35d of the support portion 35 along the Y-axis. More specifically, four movable electrode portions 38 extend from the second beam portion 35c in the negative Y-axis direction, and four movable electrode portions 38 extend from the second beam portion 35d in the positive Y-axis direction. In the illustrated example, two movable electrode portions 38 extending from the second beam portion 35c and two movable electrode portions 38 extending from the second beam portion 35d are arranged on the negative X-axis side of the coupling portion 36. Moreover, two movable electrode portions 38 extending from the second beam portion 35c and two movable electrode portions 38 extending from the second beam portion 35d are arranged on the positive X-axis side of the coupling portion 36.

The fixed electrode portions 39a and 39b are fixed (bonded) to the post portion 18b of the substrate 10. The fixed electrode portions 39a and 39b are arranged to face the movable electrode portions 38. In the illustrated example, two movable electrode portions 38 face one fixed electrode portion 39a. More specifically, the movable electrode portion 38 extending from the second beam portion 35c and the movable electrode portion 38 extending from the second beam portion 35d face the fixed electrode portion 39a. Similarly, two movable electrode portions 38 face one fixed electrode portion 39b. More specifically, the movable electrode portion 38 extending from the second beam portion 35c and the movable electrode portion 38 extending from the second beam portion 35d face the fixed electrode portion 39b.

The fixed electrode portions 39a and 39b extend along the Y-axis. For example, the plurality of fixed electrode portions 39a and the plurality of fixed electrode portions 39b are disposed. More specifically, the fixed electrode portions 39a and 39b are alternately arranged along the X-axis, and the movable electrode portions 38 are arranged between the fixed electrode portion 39a and the fixed electrode portion 39b. The plurality of fixed electrode portions 39a are electrically connected to each other with a wiring (not shown). The plurality of fixed electrode portions 39b are electrically connected to each other with a wiring (not shown).

In the illustrated example, two fixed electrode portions 39a and two fixed electrode portions 39b are arranged on the negative X-axis side of the coupling portion 36. Moreover, two fixed electrode portions 39a and two fixed electrode portions 39b are arranged on the positive X-axis side of the coupling portion 36.

The fixed electrode portions 39a and 39b each have, for example, a wide portion 40 whose width (size in the X-axis direction) is wider than that of the other portion. In the illustrated example, the planar shape of the wide portion 40 is quadrilateral. Due to the wide portion 40, the contact areas between the fixed electrode portions 39a and 39b and the post portion 18b can be increased. Therefore, the bonding strength between the fixed electrode portions 39a and 39b and the post portion 18b can be increased.

The fixed portion 32 and the movable body 34 are integrally disposed as the structure 31. The material of the functional element 30 is, for example, silicon doped with an impurity such as phosphorus or boron to provide electrical conductivity.

A method for bonding the fixed portion 32 and the fixed electrode portions 39a and 39b with the substrate 10 is not particularly limited. However, when, for example, the material of the substrate 10 is glass and the material of the functional element 30 is silicon, the substrate 10 and the functional element 30 can be anodically bonded together.

In the physical quantity sensor 100, it is possible to measure an electrostatic capacitance between the movable electrode portion 38 and the fixed electrode portion 39a and further an electrostatic capacitance between the movable electrode portion 38 and the fixed electrode portion 39b. In the physical quantity sensor 100 as described above, the electrostatic capacitance between the movable electrode portion 38 and the fixed electrode portion 39a and the electrostatic capacitance between the movable electrode portion 38 and the fixed electrode portion 39b are separately measured, and based on the results of the measurement, a physical quantity (acceleration) can be detected with high accuracy.

As described above, the physical quantity sensor 100 can be used as an inertial sensor such as an acceleration sensor or a gyro sensor. Specifically, the physical quantity sensor 100 can be used as, for example, an electrostatic capacitive acceleration sensor for measuring acceleration in the horizontal direction (X-axis direction).

The physical quantity sensor 100 according to the embodiment has, for example, the following features.

According to the physical quantity sensor 100, the support portion 35 is disposed around the fixed portion 32 in plan view. That is, the movable body 34 is supported by the fixed portion 32 located inside the support portion 35. With this configuration, in the physical quantity sensor 100, the movable body 34 can be supported stably by one fixed portion 32. Therefore, in the physical quantity sensor 100, compared to a form in which both ends of the movable body are supported by two fixed portions, the occurrence of stress in the movable body 34 due to the fact that the movable body is supported by the fixed portion 32 can be suppressed when, for example, heat is applied or the physical quantity sensor 100 is mounted using a molding resin. As a result, in the physical quantity sensor 100, the occurrence of torsion in the movable body 34, for example, can be suppressed, so that high sensitivity can be provided.

According to the physical quantity sensor 100, the fixed portion 32 is disposed to overlap, in plan view, with the center of gravity G of the structure 31 that is configured to include the fixed portion 32 and the movable body 34. Therefore, the movable body 34 can be supported more stably.

According to the physical quantity sensor 100, two movable electrode portions 38 face one fixed electrode portion 39a. Similarly, two movable electrode portions 38 face one fixed electrode portion 39b. That is, a common fixed electrode portion is disposed for two movable electrode portions 38. Therefore, the number of the wide portions 40 of the fixed electrode portion can be one for two movable electrode portions 38, and further, the number of wirings (not shown) electrically connected with the fixed electrode portion can be one. Therefore, in the physical quantity sensor 100, a reduction in size can be achieved.

According to the physical quantity sensor 100, the fixed portion 32 and the movable body 34 are integrally disposed. Therefore, the fixed portion 32 and the movable body 34 can be integrally formed by, for example, processing a silicon substrate (not shown). With this configuration, a fine processing technique used in the manufacture of silicon semiconductor devices, for example, is applicable, so that a reduction in size can be achieved.

2. Method for Manufacturing Physical Quantity Sensor

Figure 3:
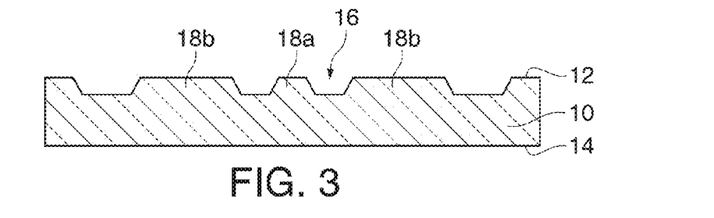
FIG. 3 is a cross-sectional view schematically showing the manufacturing process of the physical quantity sensor according to the embodiment.
Figure 4:
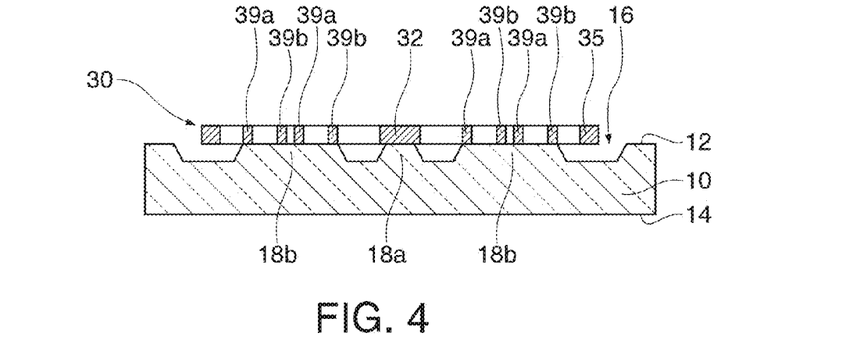
FIG. 4 is a cross-sectional view schematically showing the manufacturing process of the physical quantity sensor according to the embodiment.

Next, a method for manufacturing the physical quantity sensor according to the embodiment will be described with reference to the drawings. FIGS. 3 and 4 are cross-sectional views schematically showing the manufacturing process of the physical quantity sensor 100 according to the embodiment.

As shown in FIG. 3, the recess 16 is formed in the first surface 12 of the substrate 10. The recess 16 is formed by, for example, a photolithographic technique and an etching technique. With this configuration, the substrate 10 having the post portions 18a and 18b can be prepared.

As shown in FIG. 4, the functional element 30 is formed on the substrate 10. More specifically, the functional element 30 is formed by bonding a silicon substrate (not shown) to the post portions 18a and 18b of the substrate 10, thinning the silicon substrate, and then patterning the substrate. The patterning is performed by a photolithographic technique and an etching technique. The bonding of the silicon substrate with the substrate 10 is performed by, for example, anodic bonding.

As shown in FIG. 2, the substrate 10 and the lid 20 are bonded together, and the functional element 30 is accommodated in the cavity 22 surrounded by the substrate 10 and the lid 20. The bonding of the substrate 10 with the lid 20 is performed by, for example, anodic bonding.

Through the processes described above, the physical quantity sensor 100 can be manufactured.

According to the method for manufacturing the physical quantity sensor 100, it is possible to form the physical quantity sensor 100 that can suppress the occurrence of stress in the movable body 34.

3. Modified Examples of Physical Quantity Sensor 3. 1. First Modified Example

Figure 5:
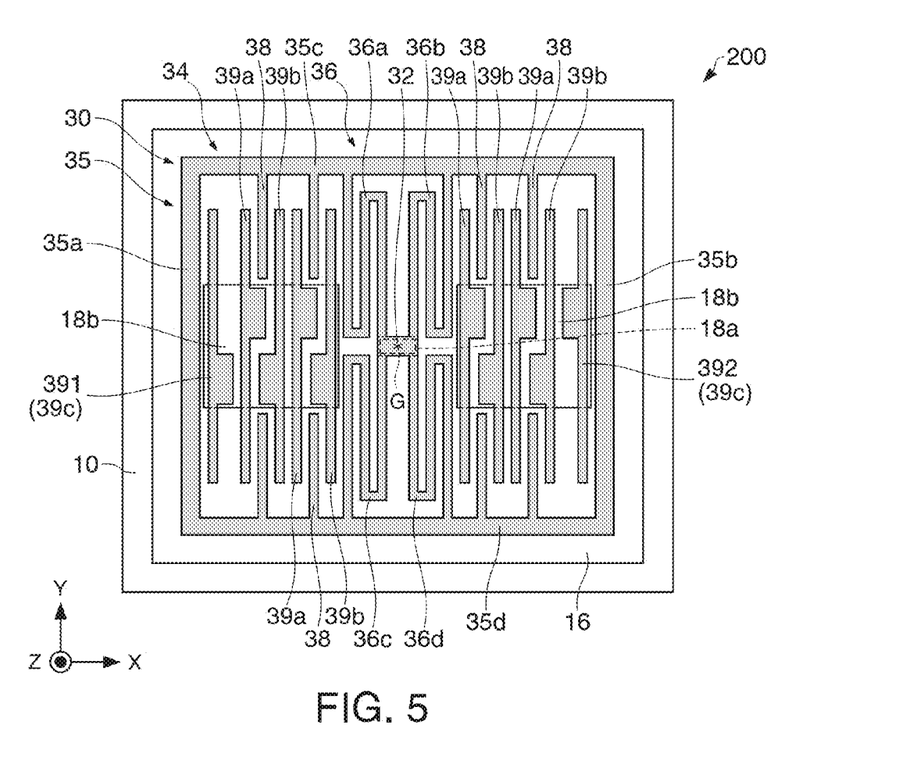
FIG. 5 is a plan view schematically showing a physical quantity sensor according to a first modified example of the embodiment.

Next, a physical quantity sensor according to a first modified example of the embodiment will be described with reference to the drawing. FIG. 5 is a plan view schematically showing the physical quantity sensor 200 according to the first modified example of the embodiment. In FIG. 5, the X-axis, the Y-axis, and the Z-axis are illustrated as three axes perpendicular to each other. Hereinafter, in the physical quantity sensor 200, members having functions similar to those of the constituent members of the physical quantity sensor 100 described above are denoted by the same reference numerals and signs, and the detailed descriptions thereof are omitted.

In the physical quantity sensor 100 as shown in FIG. 1, the first beam portions 35a and 35b of the support portion 35 do not have a function of the movable electrode portion 38. In contrast to this, in the physical quantity sensor 200 as shown in FIG. 5, the first beam portions 35a and 35b of the support portion 35 can include the function of the movable electrode portion 38. That is, the support portion 35 has the electrode portions 35a and 35b. The physical quantity sensor 200 further has fixed electrode portions 39c.

The fixed electrode portions 39c are disposed on the substrate 10. More specifically, the fixed electrode portions 39c are fixed (bonded) to the post portion 18b of the substrate 10. In the illustrated example, two fixed electrode portions 39c are disposed. One fixed electrode portion 391 of them faces the first beam portion 35a of the support portion 35. The other fixed electrode portion 392 faces the first beam portion 35b of the support portion 35. More specifically, the fixed electrode portion 391 is arranged, in plan view, between the first beam portion 35a and the fixed electrode portion 39a arranged closest to the negative X-axis side in the plurality of fixed electrode portions 39a and 39b. The fixed electrode portion 392 is arranged, in plan view, between the first beam portion 35b and the fixed electrode portion 39b arranged closest to the positive X-axis side in the plurality of fixed electrode portions 39a and 39b. The plurality of fixed electrode portions 39a and 39b are disposed between the fixed electrode portions 391 and 392.

In the physical quantity sensor 200, it is possible to measure an electrostatic capacitance between the first beam portion 35a and the fixed electrode portion 391 and further an electrostatic capacitance between the first beam portion 35b and the fixed electrode portion 392. Then, based on the electrostatic capacitance between the first beam portion 35a and the fixed electrode portion 391 and the electrostatic capacitance between the first beam portion 35b and the fixed electrode portion 391, a physical quantity (acceleration) can be detected. That is, the first beam portions 35a and 35b can function as the movable electrode portions 38, so that the support portion 35 can have the electrode portions 35a and 35b.

According to the physical quantity sensor 200, the support portion 35 has the electrode portions 35a and 35b (includes the function of the movable electrode portion 38), and the fixed electrode portions 391 and 392 facing the first beam portions 35a and 35b are fixed to the substrate 10. Therefore, in the physical quantity sensor 200, compared to, for example, the physical quantity sensor 100, high sensitivity can be provided.

Further, since the physical quantity sensor 200 has the fixed electrode portions 391 and 392, it is possible to substantially eliminate an unnecessary electrostatic capacitance between the first beam portion 35a and the fixed electrode portion 39a and an unnecessary electrostatic capacitance between the first beam portion 35b and the fixed electrode portion 39b. Therefore, it is possible to reduce a distance between the first beam portion 35a and the fixed electrode portion 39a and a distance between the first beam portion 35b and the fixed electrode portion 39b. Thus, in the physical quantity sensor 200, a reduction in size can be achieved.

3. 2. Second Modified Example

Figure 6:
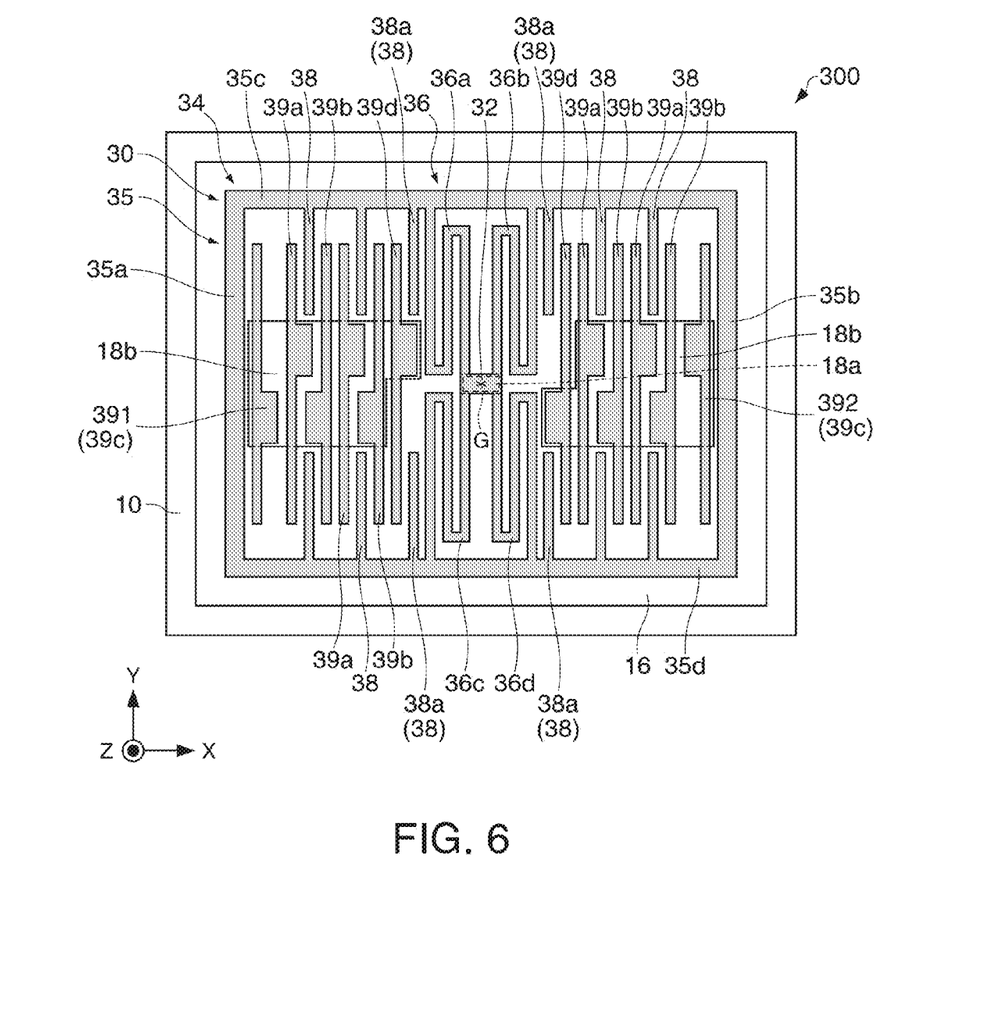
FIG. 6 is a plan view schematically showing a physical quantity sensor according to a second modified example of the embodiment.

Next, a physical quantity sensor according to a second modified example of the embodiment will be described with reference to the drawing. FIG. 6 is a plan view schematically showing the physical quantity sensor 300 according to the second modified example of the embodiment. In FIG. 6, the X-axis, the Y-axis, and the Z-axis are illustrated as three axes perpendicular to each other. Hereinafter, in the physical quantity sensor 300, members having functions similar to those of the constituent members of the physical quantity sensors 100 and 200 described above are denoted by the same reference numerals and signs, and the detailed descriptions thereof are omitted.

In the physical quantity sensor 100, the first beam portions 35a and 35b of the support portion 35 do not include the function of the movable electrode portion 38, and further the fixed electrode portions 39a and 39b are disposed next to the coupling portion 36. In contrast to this, in the physical quantity sensor 300 as shown in FIG. 6, the first beam portions 35a and 35b have the function of the movable electrode portion 38 similarly to the physical quantity sensor 200, and further the movable electrode portions 38 (movable electrode portions 38a) are disposed next to the coupling portion 36.

The movable electrode portions 38a are disposed to face fixed electrode portions 39d. The fixed electrode portions 39d are disposed on the coupling portion 36 side of the fixed electrode portions 39a and 39b. The fixed electrode portion 39d is fixed (bonded) to the post portion 18b of the substrate 10. The fixed electrode portion 39d extends along the Y-axis.

The movable electrode portions 38a are next to the coupling portion 36. That is, the fixed electrode portions 39a, 39b, and 39d are not disposed between the movable electrode portions 38a and the coupling portion 36. The movable electrode portions 38a can have, for example, the same potential as that of the movable body 34.

In the physical quantity sensor 300, an electrostatic capacitance between the movable electrode portion 38a and the fixed electrode portion 39d can be measured. Then, based on the electrostatic capacitance between the movable electrode portion 38a and the fixed electrode portion 39d, a physical quantity (acceleration) can be detected.

According to the physical quantity sensor 300, the exertion of an electrostatic force on the coupling portion 36 due to the fixed electrode portions 39a, 39b, and 39d can be suppressed by the movable electrode portions 38a. With this configuration, the movable body 34 can operate stably. Moreover, in the physical quantity sensor 300, distances between, for example, the coupling portion 36 and the fixed electrode portions 39a, 39b, and 39d can be reduced, so that a reduction in size can be achieved.

3. 3. Third Modified Example

Figure 7:
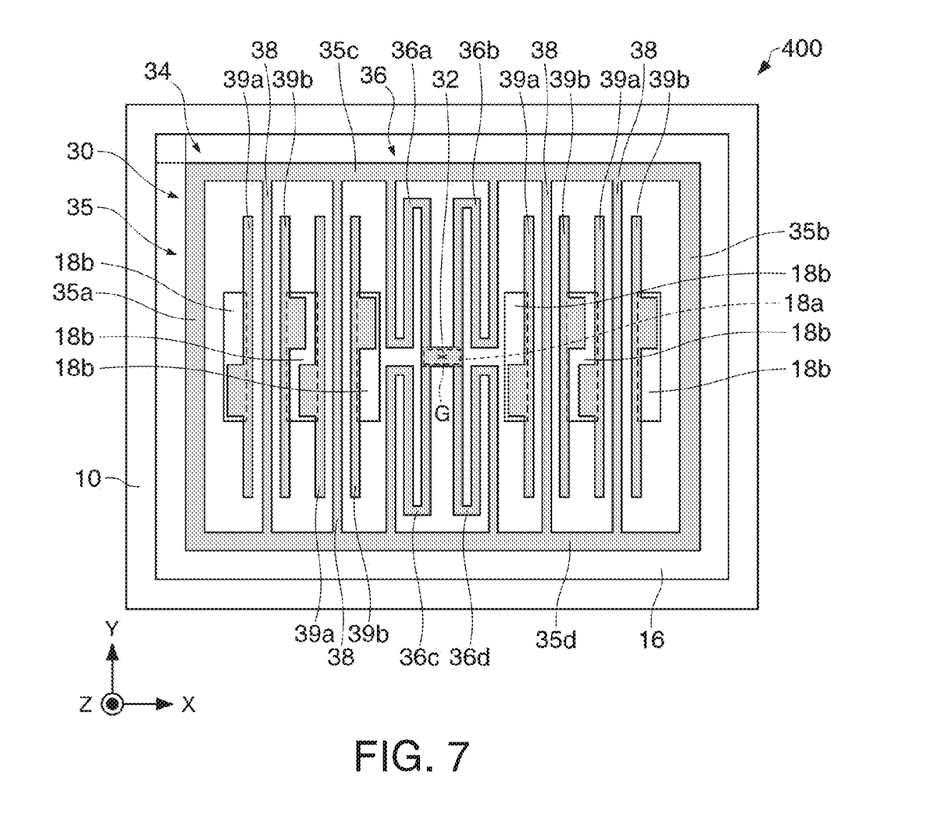
FIG. 7 is a plan view schematically showing a physical quantity sensor according to a third modified example of the embodiment.

Next, a physical quantity sensor according to a third modified example of the embodiment will be described with reference to the drawings. FIG. 7 is a plan view schematically showing the physical quantity sensor 400 according to the third modified example of the embodiment. In FIG. 7, the X-axis, the Y-axis, and the Z-axis are illustrated as three axes perpendicular to each other. Hereinafter, in the physical quantity sensor 400, members having functions similar to those of the constituent members of the physical quantity sensor 100 described above are denoted by the same reference numerals and signs, and the detailed descriptions thereof are omitted.

In the physical quantity sensor 100 as shown in FIG. 1, only one end of the movable electrode portion 38 is connected to the support portion 35. In contrast to this, in the physical quantity sensor 400 as shown in FIG. 7, both ends of the movable electrode portion 38 are connected to the support portion 35. More specifically, one end of the movable electrode portion 38 is connected to the second beam portion 35c of the support portion 35, while the other end of the movable electrode portion 38 is connected to the second beam portion 35d of the support portion 35. It can be said that both ends of the movable electrode portion 38 are connected respectively to the second beam portions.

According to the physical quantity sensor 400, high rigidity can be provided compared to the physical quantity sensor 100. Further, according to the physical quantity sensor 400, since the areas of portions of the movable electrode portion 38, where the portions face the fixed electrode portions 39a and 39b, can be increased compared to the physical quantity sensor 100, sensitivity can be enhanced. Moreover, according to the physical quantity sensor 400, sensitivity equivalent to that of the physical quantity sensor 100 can be provided while achieving a reduction in size.

Figure 8:
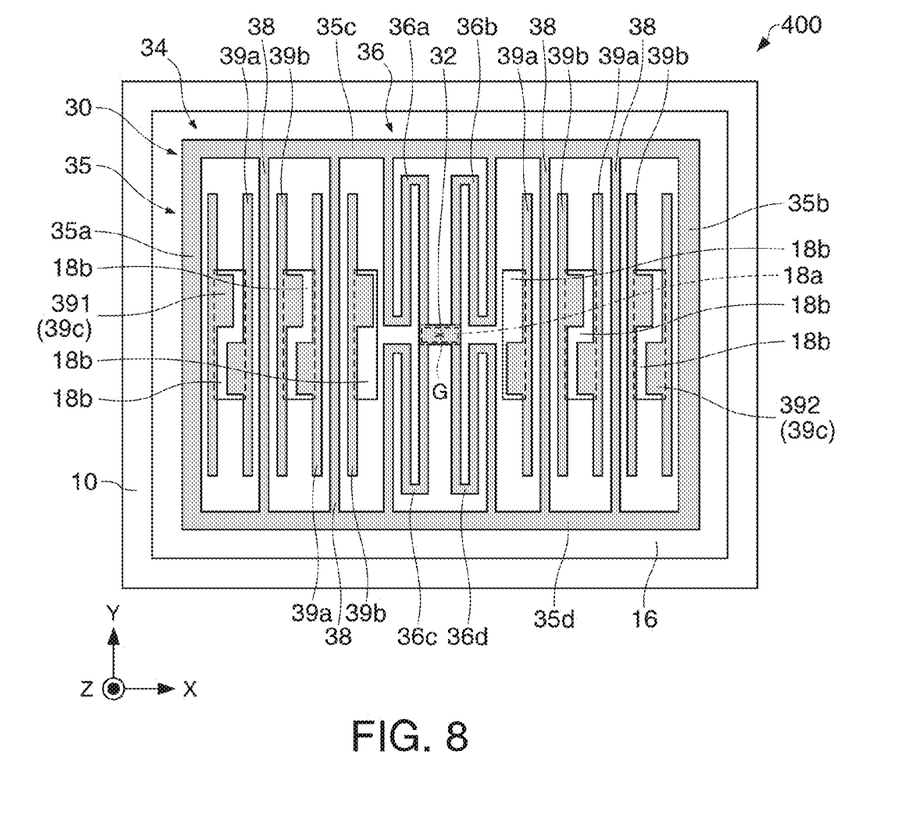
FIG. 8 is a plan view schematically showing the physical quantity sensor according to the third modified example of the embodiment.

As shown in FIG. 8, the physical quantity sensor 400 may have the fixed electrode portion 39c, and the first beam portions 35a and 35b of the support portion 35 may include the function of the movable electrode portion 38, similarly to the physical quantity sensor 200.

Figure 9:
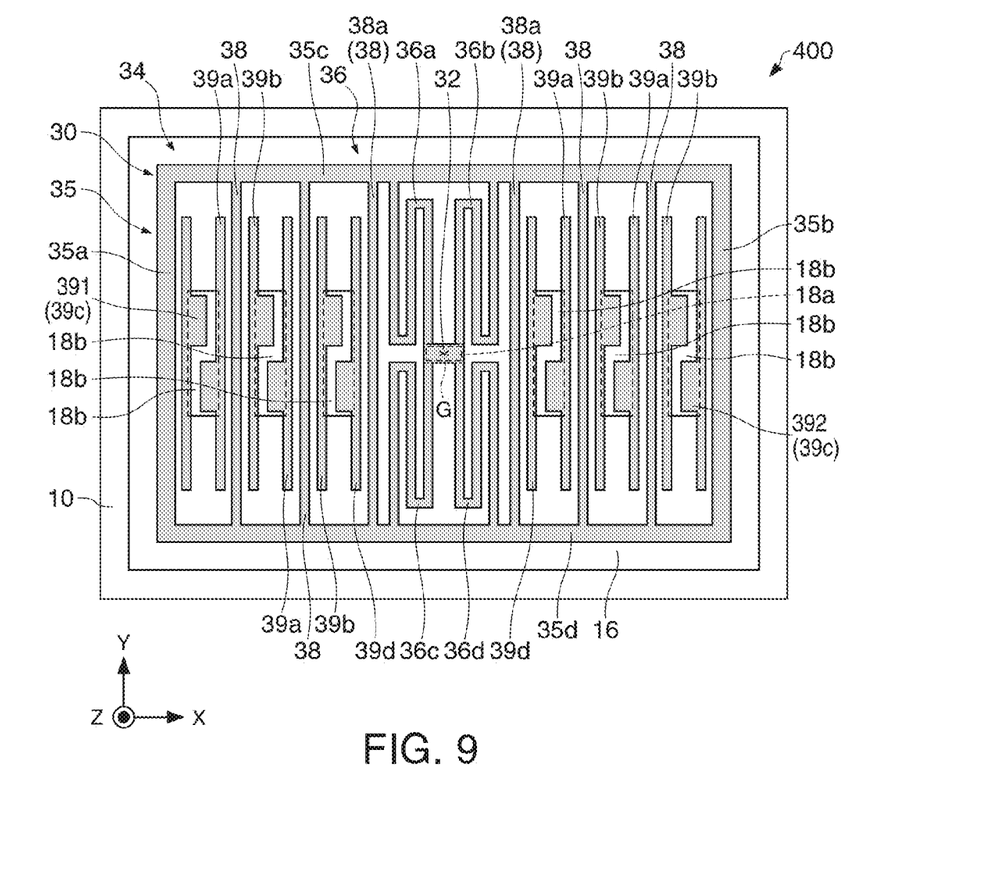
FIG. 9 is a plan view schematically showing the physical quantity sensor according to the third modified example of the embodiment.

Further, in the physical quantity sensor 400 as shown in FIG. 9, the movable electrode portions 38 (the movable electrode portions 38a) may be disposed next to the coupling portion 36 similarly to the physical quantity sensor 300.

4. Electronic Apparatuses

Next, electronic apparatuses according to the embodiment will be described with reference to the drawings. The electronic apparatuses according to the embodiment include any of the physical quantity sensors according to the embodiment of the invention. In the following, electronic apparatuses including the physical quantity sensor 100 as the physical quantity sensor according to the embodiment of the invention will be described.

Figure 10:
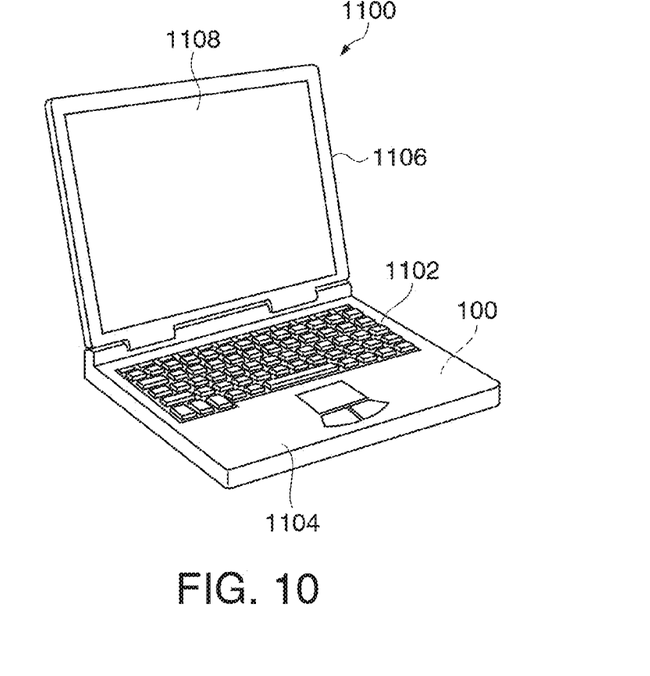
FIG. 10 is a perspective view schematically showing an electronic apparatus according to the embodiment.

FIG. 10 is a perspective view schematically showing a mobile (or notebook) personal computer 1100 as an electronic apparatus according to the embodiment.

As shown in FIG. 10, the personal computer 1100 includes a main body portion 1104 including a keyboard 1102 and a display unit 1106 having a display portion 1108. The display unit 1106 is rotationally movably supported relative to the main body portion 1104 via a hinge structure portion.

In the personal computer 1100, the physical quantity sensor 100 is incorporated.

Figure 11:
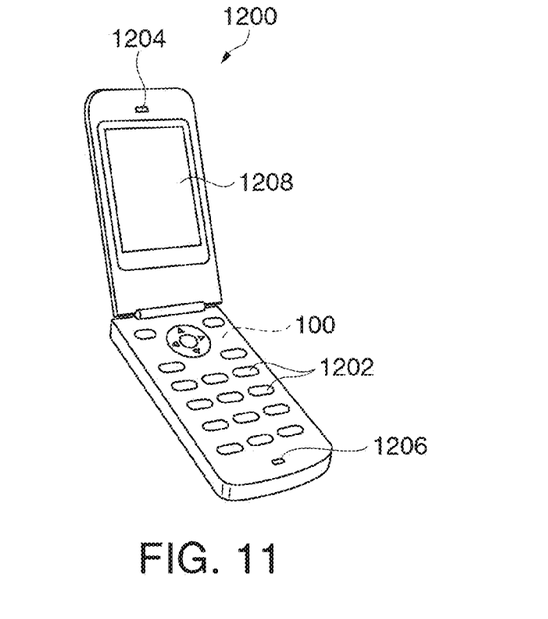
FIG. 11 is a perspective view schematically showing an electronic apparatus according to the embodiment.

FIG. 11 is a perspective view schematically showing a mobile phone (including a PHS) 1200 as an electronic apparatus according to the embodiment.

As shown in FIG. 11, the mobile phone 1200 includes a plurality of operation buttons 1202, an earpiece 1204, and a mouthpiece 1206. A display portion 1208 is arranged between the operation buttons 1202 and the earpiece 1204.

In the mobile phone 1200, the physical quantity sensor 100 is incorporated.

Figure 12:
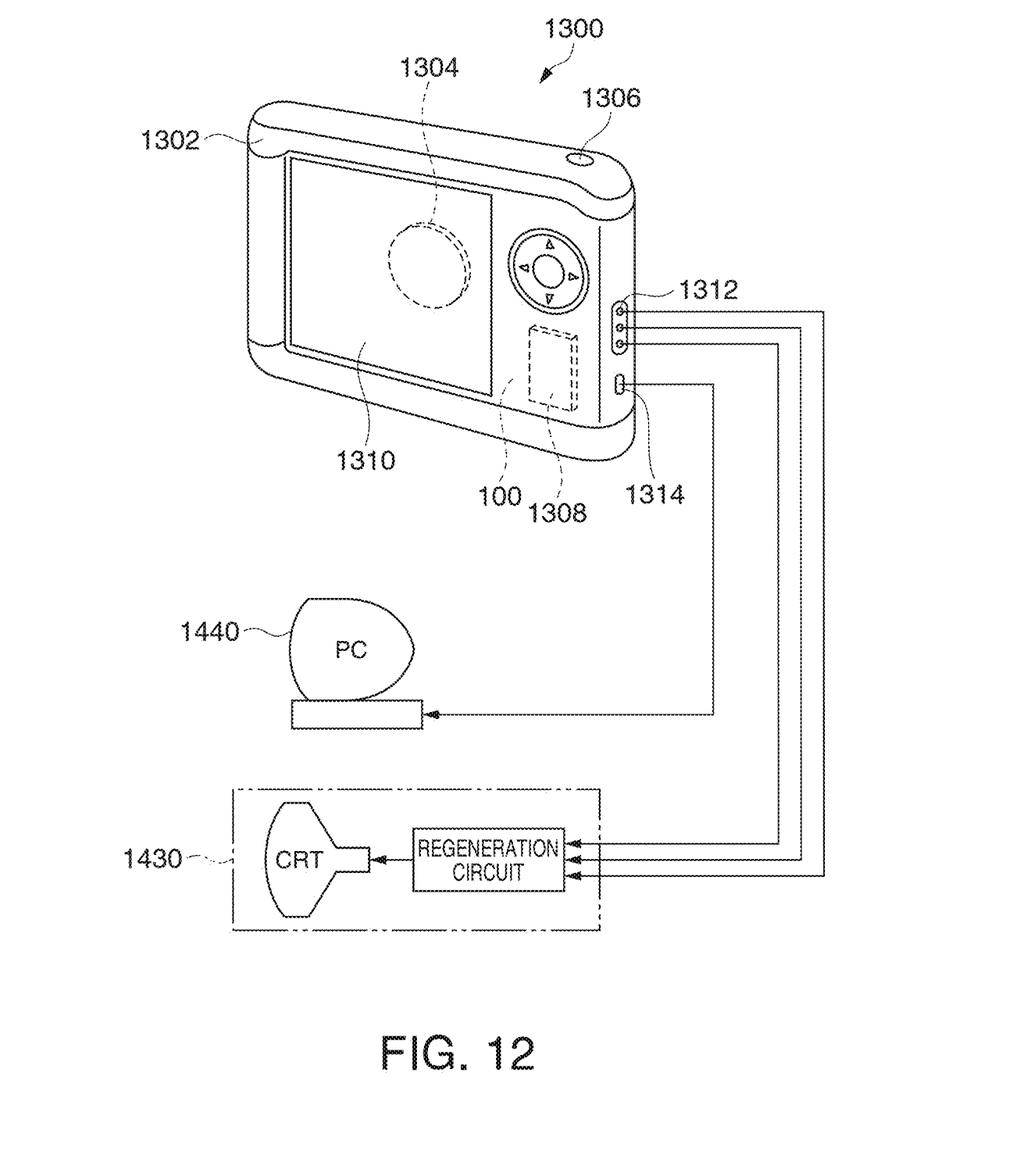
FIG. 12 is a perspective view schematically showing an electronic apparatus according to the embodiment.

FIG. 12 is a perspective view schematically showing a digital still camera 1300 as an electronic apparatus according to the embodiment. In FIG. 12, connections with external apparatuses are also shown in a simplified manner.

Here, usual cameras expose a silver halide photographic film with an optical image of a subject, whereas the digital still camera 1300 photoelectrically converts an optical image of a subject with an imaging element such as a CCD (Charge Coupled Device) to generate imaging signals (image signals).

A display portion 1310 is disposed on the back surface of a case (body) 1302 in the digital still camera 1300 and configured to perform display based on imaging signals generated by a CCD. The display portion 1310 functions as a finder that displays a subject as an electronic image.

Moreover, on the front side (the rear side in the drawing) of the case 1302, a light receiving unit 1304 including an optical lens (imaging optical system) and a CCD is disposed.

When a photographer confirms a subject image displayed on the display portion 1310 and presses down a shutter button 1306, imaging signals of a CCD at the time are transferred to and stored in a memory 1308.

Moreover, in the digital still camera 1300, a video signal output terminal 1312 and a data communication input/output terminal 1314 are disposed on the side surface of the case 1302. Then, a television monitor 1430 and a personal computer 1440 are connected as necessary to the video signal output terminal 1312 and the data communication input/output terminal 1314, respectively. Further, the imaging signals stored in the memory 1308 are output to the television monitor 1430 or the personal computer 1440 by a predetermined operation.

In the digital still camera 1300, the physical quantity sensor 100 is incorporated.

The electronic apparatuses 1100, 1200, and 1300 described above can have the physical quantity sensor 100 that can suppress the occurrence of stress in the movable body 34.

An electronic apparatus including the physical quantity sensor 100 can be applied to for example, in addition to the personal computer (mobile personal computer) shown in FIG. 10, the mobile phone shown in FIG. 11, and the digital still camera shown in FIG. 12, inkjet ejection apparatuses (for example, inkjet printers), laptop personal computers, television sets, video camcorders, video tape recorders, various kinds of navigation systems, pagers, electronic notebooks (including those with communication function), electronic dictionaries, calculators, electronic gaming machines, word processors, workstations, videophones, surveillance television monitors, electronic binoculars, POS terminals, medical equipment (for example, electronic thermometers, sphygmomanometers, blood glucose meters, electrocardiogram measuring systems, ultrasonic diagnosis apparatuses, and electronic endoscopes), fishfinders, various kinds of measuring instrument, indicators (for example, indicators used in vehicles, aircraft, rockets, and ships), the attitude control of robots or the human body, flight simulators, and the like.

The embodiment and modified examples described above are illustrative only, and the invention is not limited to them. For example, the embodiment and each of the modified examples can be appropriately combined.

The invention includes a configuration (for example, a configuration having the same function, method, and result, or a configuration having the same advantage and effect) that is substantially the same as those described in the embodiment. Moreover, the invention includes a configuration in which a non-essential portion of the configurations described in the embodiment is replaced. Moreover, the invention includes a configuration providing the same operational effects as those described in the embodiment, or a configuration capable of achieving the same advantages. Moreover, the invention includes a configuration in which a publicly known technique is added to the configurations described in the embodiment.

The entire disclosure of Japanese Patent Application No. 2012-084156, filed Apr. 2, 2012 is expressly incorporated by reference herein.

What is claimed is:

1. A physical quantity sensor comprising:
a fixed portion;
a fixed electrode portion; and
a movable body that includes a support portion disposed around the fixed portion in plan view, a movable electrode portion supported by the support portion, extending along a first axis, and arranged to face the fixed electrode portion, and a coupling portion coupling the fixed portion with the support portion, and is displaceable along a second axis crossing the first axis, wherein the coupling portion includes at least a first beam portion that extends along the first axis, a second beam portion that extends along the second axis, and a third beam portion that extends along the first axis, the support portion connecting to the third beam portion, and the fixed portion connecting to the first beam portion.

2. The physical quantity sensor according to claim 1, wherein the support portion includes a first beam portion that extends along the first axis and a second beam portion that extends along the second axis.

3. The physical quantity sensor according to claim 2, wherein
the first beam portion includes an electrode portion of the movable electrode portion, and
the fixed electrode portion is disposed to face the first beam portion.

4. The physical quantity sensor according to claim 2, wherein
a pair of the second beam portions are disposed along the second axis, and
the movable electrode portion extends from each of the second beam portions along the first axis.

5. The physical quantity sensor according to claim 4, wherein
at least two of the movable electrode portions face the fixed electrode portion.

6. The physical quantity sensor according to claim 2, wherein
a pair of the second beam portions are disposed along the second axis, and
a first end and a second end of the movable electrode portion are connected respectively to the second beam portions.

7. The physical quantity sensor according to claim 2, wherein the moveable electrode portion extends from the second beam portion, and the coupling portion is connected to the second beam portion.

8. The physical quantity sensor according to claim 1, wherein
the fixed portion is disposed to overlap, in plan view, with the center of gravity of a structure that is configured to include the fixed portion and the movable body.

9. The physical quantity sensor according to claim 1, wherein the movable electrode portion is disposed next to the coupling portion.

10. An electronic apparatus comprising the physical quantity sensor according to claim 1.

* * * * *